(12) United States Patent
Ciabattoni

(10) Patent No.: US 9,759,911 B2
(45) Date of Patent: Sep. 12, 2017

(54) READING DEVICE FOR READING CODED INFORMATION AND METHOD FOR FOCUSING SUCH A READING DEVICE

(71) Applicant: Datalogic IP Tech S.R.L., Calderara di Reno (Bologna) (IT)

(72) Inventor: Stefano Ciabattoni, Bologna (IT)

(73) Assignee: DATALOGIC IP TECH S.R.L., Bologna (IT)

( * ) Notice: Subject to any disclaimer, the term of this patent is extended or adjusted under 35 U.S.C. 154(b) by 0 days.

(21) Appl. No.: 14/910,382

(22) PCT Filed: Aug. 6, 2013

(86) PCT No.: PCT/IT2013/000221
§ 371 (c)(1),
(2) Date: Feb. 5, 2016

(87) PCT Pub. No.: WO2015/019369
PCT Pub. Date: Feb. 12, 2015

(65) Prior Publication Data
US 2016/0178897 A1 Jun. 23, 2016

(51) Int. Cl.
*G06K 7/10* (2006.01)
*G02B 26/12* (2006.01)
(Continued)

(52) U.S. Cl.
CPC ........... *G02B 26/123* (2013.01); *G02B 7/021* (2013.01); *G02B 7/025* (2013.01); *G02B 26/124* (2013.01);
(Continued)

(58) Field of Classification Search
CPC ........... G06K 7/10574; G06K 7/10732; G06K 7/10831
(Continued)

(56) References Cited

U.S. PATENT DOCUMENTS 7,389,926 B2 * 6/2008 Aoki .................. G06K 7/10722
235/400
8,448,867 B2 * 5/2013 Liu ..................... G06K 7/10732
235/435
(Continued)

FOREIGN PATENT DOCUMENTS

JP    H05 225300 A    1/1993

OTHER PUBLICATIONS

International Search Report for PCT/IT2013/000221, dated Oct. 6, 2014, 2 pgs.

*Primary Examiner* — Seung Lee
(74) *Attorney, Agent, or Firm* — Dentons US LLP

(57) ABSTRACT

Device (100) for reading coded information, comprising a first optical group (10) including a first light source and first focusing means in optical alignment with said light source along an optical axis (X), and at least one further optical group including a further light source and further focusing means in optical alignment with the further light source along an optical axis (X1) parallel to the optical axis (X). The first optical group (10) and the further optical group (20) are housed in a single one-piece block (50) obtained through a single mechanical processing that, preferably, is a machine tool processing. The number of components of the reading device is thus reduced and the calibration operations necessary to achieve the desired optical alignment between light sources and with the respective focusing means are simplified and automated. Consequently, the costs of material and qualified workers are reduced, as is the time needed to calibrate the reading device.

32 Claims, 10 Drawing Sheets

(51) Int. Cl.
  *G02B 7/02* (2006.01)
  *G02B 27/62* (2006.01)
(52) U.S. Cl.
  CPC ......... *G02B 27/62* (2013.01); *G06K 7/10574* (2013.01); *G06K 7/10732* (2013.01); *G06K 7/10831* (2013.01)
(58) Field of Classification Search
  USPC ................................................ 235/454, 453
  See application file for complete search history.

(56) References Cited

U.S. PATENT DOCUMENTS

| | | |
|---|---|---|
| 2002/0001118 A1 | 1/2002 | Nakajima et al. |
| 2003/0029917 A1* | 2/2003 | Hennick ............ G06K 7/10732 235/454 |
| 2004/0184127 A1 | 9/2004 | Nakajima et al. |
| 2005/0024479 A1 | 2/2005 | Itabashi et al. |
| 2008/0149726 A1 | 6/2008 | Knowles et al. |
| 2009/0026267 A1* | 1/2009 | Wang ........................ G06K 7/10 235/440 |
| 2009/0309952 A1 | 12/2009 | Akatsu |

* cited by examiner

READING DEVICE FOR READING CODED INFORMATION AND METHOD FOR FOCUSING SUCH A READING DEVICE

CROSS REFERENCE TO RELATED APPLICATIONS

This application is a 371 National Stage Application of International Application No. PCT/IT2013/000221, filed Aug. 6, 2013, which is incorporated herein by reference in its entirety.

The present invention relates, in a first aspect thereof, to a reading device for reading coded information.

The invention also relates to a method for focusing the aforementioned reading device.

Throughout the following description and the following claims, the expression: "reading coded information" is used to indicate the acquisition of information related to an object (for example distance, volume, overall dimensions, or object identification data) for example through the acquisition and processing of a light signal diffused by the same object. In this case the term: "coded information" is used to indicate the whole identification data contained in an optical code.

The term: "optical code" is used to indicate any graphical representation having the function of storing a coded information. A particular example of optical code consists of the linear or two-dimensional codes, wherein the information is coded through suitable combinations of elements having a predetermined shape, for example squared, rectangular or hexagonal, of dark colour (usually black) separated by clear elements (spaces, usually white), such as barcodes, stacked codes and two-dimensional codes in general, colour codes, etc. The term "optical code" further comprises, more generally, also other graphical patterns with information coding function, including clear printed characters (letters, numbers, etc.) and special patterns (such as stamps, logos, signatures, fingerprints, etc.). The term "optical code" also comprises graphical representations which are detectable not only in the field of visible light but also in the range of wavelengths comprised between infrared and ultraviolet.

For the sake of simplicity of description, hereafter explicit reference will be made to optical code readers (commonly called: scanners).

Devices for reading optical codes comprising a single light source that is typically a laser (monolaser, fixed focus or autofocus reading devices) are known as well as devices for reading optical codes comprising many light sources (multilaser or multifocus reading devices).

Multilaser reading devices essentially comprise two or more sources of respective laser light beams, a scanning device for scanning the aforementioned laser light beams on the optical code to be read, a photo-receiver device adapted to collect the light diffused by the illuminated code and to generate an electrical signal proportional to the intensity of the collected light and a device for processing the aforementioned electrical signal adapted to provide, in conclusion, the sequence of the decoded characters of the optical code read.

Typically, between each light source and the scanning device there are one or more deflecting mirrors of the laser light emitted by the light source.

Downstream of each of the light sources and upstream of the aforementioned deflecting mirrors a respective focusing device for focusing the light beam is provided. Generally, each focusing device comprises at least one convergent lens and possibly a diaphragm. The focusing device is adapted to focus the light beam passing through it at a desired distance, such a distance corresponding to that at which the optical code to be read is arranged. Optimal focusing is achieved by adjusting the axial position of the focusing device with respect to the light source.

Some examples of multilaser reading devices are described and shown in EP 0926615, which represents the closest prior art that the Applicant is aware of.

The Applicant observed that the multilaser reading devices of the prior art require suitable calibration operations in order to obtain the desired optical parallel arrangement between the various light beams emitted by the different light sources, as well as the desired optical alignment between each light source and the respective focusing device and between each focusing device and the respective deflecting mirrors.

In practice, the aforementioned calibration operations require extremely fine adjustment of the position of each light source with respect to the other light sources, as well as of the position of each focusing device with respect to a respective light source and of each deflecting mirror with respect to a respective focusing device (and therefore to a respective light source).

In the multilaser reading devices known to the Applicant all of the components that need to be adjusted are mounted on a supporting board through suitable adjustment screws and the calibration/adjustment operations described above are carried out by a specialised worker by acting manually on the aforementioned adjustment screws.

The Applicant observed that, due to the large number of components that need to be adjusted and to the need to proceed exclusively by manual interventions, in the multilaser reading devices that are currently known the calibration operations are extremely long and complex.

The Applicant thus considered the problem of simplifying as much as possible the calibration operations in multilaser reading devices.

For this purpose, the Applicant has though to simplify as much as possible the mechanical structure of the multilaser reading devices. More specifically, the Applicant has designed a mechanical structure that allows both the number of components subject to adjustment and the manual calibration interventions on such components to be reduced to the minimum, in such a way achieving a reduction in material costs and, in particular, in the costs of qualified manpower, and in the time taken for calibration.

The present invention therefore relates, in a first aspect thereof, to a reading device for reading coded information, comprising:

- a first optical group including a first light source and first focusing means in optical alignment with said first light source along a first optical axis;
- at least one further optical group including a further light source and further focusing means in optical alignment with said further light source along a further optical axis parallel to said first optical axis;

characterised in that said first optical group and at least one further optical group are housed in respective seats formed in a single one-piece block obtained through a single mechanical processing.

Throughout the present description and in the subsequent claims, the expression "optical alignment" is used to indicate a condition of substantial coincidence between the optical axes of two distinct optical components (light source and focusing means, in the case discussed above).

Throughout the present description and in the subsequent claims, the expression "single mechanical processing" is used to indicate any mechanical processing in which, after the semi-worked piece from which the final piece will be obtained has been positioned in the machine by a worker, there are no subsequent steps of handling and repositioning of the semi-worked piece by the worker.

Advantageously, the fact that all of the optical groups of the reading device of the present invention are housed in a single one-piece block makes it possible to simplify the calibration operations of the reading device and to reduce the specialised workforce costs, at the same time ensuring high precision of positioning of the various light sources and of the respective focusing devices. In fact, the precision of positioning is in this case only relied on the mechanical manufacturing processing of the one-piece block. Such a mechanical processing does not include any manual repositioning of the piece being worked, thus avoiding making possible repositioning errors. Furthermore, there is no need to use adjustment screws and/or specific housing blocks for each of the optical groups of the reading device, thus achieving a reduction in the number of mechanical components of the reading device and, therefore, of the material costs.

Basically, the correct optical parallel arrangement between the light beams of the different light sources and the correct optical alignment between light source and respective focusing device (and, therefore, more generally, the adjustment of the position of the aforementioned first and further optical groups) is obtained in a totally automatic way at the design and manufacturing stage of the one-piece block, without the need for manual interventions by specialised workers on adjustment screws or the like.

In general, the aforementioned mechanical processing can be any mechanical processing capable of ensuring the desired precision of processing.

In a preferred embodiment of the present invention, such a one-piece block is made through a machine tool processing.

Preferably, such a machine tool is a conventional multi-axis numerical control machine tool. This type of machine, as known, is capable of reaching even very tight dimensional tolerances through totally automatic processing.

In alternative embodiments of the present invention, the aforementioned one-piece block is made through an ultra-precise moulding processing.

Preferably, the one-piece block is a solid block, i.e. it does not have any area in which the material has been removed for weight reduction purposes. The Applicant has thus pursued a design choice that goes away from the conventional ones typically aimed at making the pieces lighter.

The design choice of the Applicant also allows the structural rigidity of the block to be maximised, with a consequent advantage in terms of precision of mutual positioning of the single components in the one-piece block.

The design choice of the Applicant also makes it possible to ensure a high mass for dissipating the heat generated by the light sources, with a consequent increase in the useful lift of such sources.

Advantageously, the provision of a large mass for dissipating heat allows, being the service life equal, the use of even very high power light sources.

Preferably, the one-piece block has a dissipating mass of about 10 cm$^3$ for each of the light sources being used. In particular, the Applicant has found that, in the case in which two lasers are used, each of which having a maximum power equal to 50 mW, and the maximum operating temperature of the reading device being 50° C., in order to obtain the desired large dissipating mass it is advantageous to use a one-piece block made of aluminium having a volume of at least 10 cm$^3$ for each laser (i.e. in the specific case discussed herein an overall volume of at least 20 cm$^3$), with a tolerance of ±10%.

In preferred embodiments of the present invention, the one-piece block comprises:
- a first seat for housing said first light source and said first focusing means, said first seat being formed coaxially to a first longitudinal axis;
- at least one further seat for housing said further light source and said further focusing means, said at least one further seat being formed coaxially to a further longitudinal axis parallel to said first longitudinal axis; wherein said first longitudinal axis and further longitudinal axis coincide with said first optical axis and further optical axis, respectively.

Advantageously, the desired mutual positioning between the various light sources and of the focusing means with respect to the light sources is thus achieved by forming in the one-piece block suitable housing seats having respective parallel axes. This is obtained in an extremely simple manner and with high degrees of precision thanks to the automation and precision of the machine tool processing through which the one-piece block is manufactured.

Preferably, the one-piece block comprises a base surface for mounting in said reading device and said first longitudinal axis and further longitudinal axis are at different distances from said base surface. In this way, it is obtained not only the desired optical parallel arrangement between the light beams emitted by the various light sources housed in the one-piece block, but it is also obtained an advantageous propagation of the aforementioned light beams at different heights, which facilitates the mutual arrangement of the deflecting mirrors provided downstream of the light sources to direct the respective light beams towards the optical code to be read. Indeed, the different heights of propagation of the light beams impose a different height of positioning of the respective deflecting mirrors, thus avoiding a deflecting mirror which deviates one light beam obstructing the optical path of different light beam (otherwise it would be necessary to use a very expensive deflecting mirror since it would have a reflective portion to allows a light beam to be deviated and a transmitting portion to allow another light beam to pass).

In preferred embodiments of the reading device of the present invention, said first light source and further light source are coupled by interference with said first seat and further seat, respectively. Such a type of coupling ensures high precision and stability of positioning. Moreover, in this way the mutual contact surface between the one-piece block and the light sources is increased, with consequent advantageous effects in terms of dissipation of the heat generated by the light sources, which can in this case even be of very high power. However, it is possible to foresee couplings which are different from the interference coupling, provided that they are capable of ensuring good thermal conductivity.

Preferably, the first focusing means are housed in a first barrel and said further focusing means are housed in a further barrel, said first barrel and further barrel being sized so as to be slidably coupled in said first seat and further seat, respectively. Advantageously, such a sliding coupling allows the adjustment of the distance of the barrel from the respective light source and, therefore, the focusing of the light beam emitted by said light source. The aforementioned adjustment is carried out without losing the correct optical alignment between light source and barrel.

Preferably, each barrel comprises at least one convergent lens (more preferably two lenses, of which at least one is convergent) and a diaphragm.

In the preferred embodiments of the reading device of the present invention, said first barrel and further barrel are fixed in position in said first seat and further seat, respectively, through an adhesive substance, preferably a glue that polymerises when irradiated by ultraviolet light (UV glue).

Preferably, each of said first barrel and further barrel comprises a respective annular groove. Advantageously, such a groove is adapted to be engaged, in the calibration operation of the reading device, by an arm of an adjustment apparatus for adjusting the distance of the barrel from the respective light source. Through such an arm, the barrel is moved axially with respect to the respective light source until the light beam emitted by said light source is focused at the desired distance. Throughout the present description, the aforementioned adjustment apparatus will also be indicated with the expression "focusing equipment".

Thanks to the annular shape thereof, forming the groove is extremely easy if, as in the preferred embodiments of the present invention, the groove is made through a machine tool processing.

Preferably, the annular groove has a substantially trapezoidal-shaped orthogonal cross section. Such a shape allows self-centring of the respective arm of the focusing equipment, minimising any clearances.

In the preferred embodiments of the present invention, the one-piece block comprises a first through groove open in said first seat and a further through groove open in said further seat. Such through grooves are intended to house the arms of the focusing equipment in the calibration operations of the reading device. Advantageously, the arms and the aforementioned through grooves are sized so as to avoid any mutual contact, so as not to generate friction.

In order to obtain high precision of positioning of the barrels inside the respective housing seats during the calibration operations of the reading device, the dimensions of said first through groove and further through groove are preferably selected so as to obtain the best compromise between the need to have high structural rigidity of the focusing equipment (which would require massive sizing of the arms of the focusing equipment) and that of maintaining a sufficient strength and stability of the one-piece block (which would require a width of the grooves that is as small as possible). In this respect, in the preferred embodiments of the present invention, the width of the groove does not exceed 50% of the diameter of the barrel.

Preferably, said first through groove and further through groove are parallel to one another and comprise respective planes of symmetry containing said first longitudinal axis and said further longitudinal axis, respectively. In this way, the movement of each of the barrels by the respective arm of the focusing equipment takes place maintaining the desired optical alignment with the respective light source.

In the preferred embodiments of the present invention, the one-piece block further comprises a first through opening open in said first seat and a further through opening open in said further seat. Such openings allow the introduction of the adhesive substance inside the one-piece block to fix the barrels in position.

Preferably, said first through opening and further through opening have a substantially elliptical shape. In particular, they define respective slots. Advantageously, the elongated shape of the aforementioned through openings promotes the distribution of the adhesive substance on a sufficiently large surface, so as to achieve a sufficiently stable fixing in position of the barrels.

Preferably, said first through opening and further through opening are sized so as not to extend above the annular groove of the respective barrel irrespective of the axial position of said first barrel and further barrel, thus even when the barrels are at the most recessed position. In this way, the adhesive substance introduced into the one-piece block through each through opening is prevented from running away along the annular grooves of the barrels and contaminating the surface of the various components of the reading device and/or of the focusing equipment. Moreover, the adhesive substance that has possibly run along the annular grooves, is prevented from going under the barrels and being hidden by the barrels themselves, thus without being polymerised and without contributing to fixing the barrels in position in the respective seats.

Preferably, each of said first through groove and further through groove is open at said base surface and each of said first through opening and further through opening is open at a top surface of said one-piece block. In this way, during the calibration operations of the reading device, the focusing equipment can operate from below of the one-piece block, whereas the dosing of the adhesive substance can take place from above the one-piece block, thus without interfering with the focusing operation. Moreover, the adhesive substance in this way is distributed at constant thickness along the entire surface extension of the groove, which ensures homogeneous behaviour of the adhesive substance during the subsequent hardening or solidification step.

Preferably, said first barrel and further barrel are made of brass, whereas the one-piece block is preferably made of metallic material, more preferably aluminium.

In preferred embodiments of the present invention, at least the seats for housing the barrel are made of aluminium. There is thus a brass-aluminium coupling, which advantageously has a low friction coefficient.

The one-piece block can comprise, on the surface of each of the aforementioned seats, a surface coating made of a material having a low friction coefficient, preferably a material based on polytetrafluoroethylene (PTFE), also known commercially as Teflon®. In particular, it is possible to foresee a hard anodization surface treatment and an impregnation by Teflon of the seat, as they are commonly and universally defined in the field.

In general, the Applicant has found that it is advantageous to implement some provisions in order to achieve a condition of ideal compromise between the opposite needs to have, on the one hand, a low friction coefficient between barrel and respective seat during the focusing operation of the reading device, so as to obtain very small displacement resolutions and, on the other hand, a sufficiently high friction coefficient to counteract possible movements of the barrel generated by the adhesive substance during the hardening or solidification step, so as to avoid undesired displacements of the focus.

According to the Applicant, it is possible to achieve the aforementioned condition of ideal compromise by obtaining a suitable balancing of the forces to which the barrel is subjected during the focusing and fixing in position operations as a consequence of the hardening or solidification of the adhesive substance. The Applicant has, indeed, found that, during the aforementioned operations, the barrel is subjected to forces acting in opposite directions: a first force, acting along a first direction, is generated by the thrust exerted by the adhesive substance that solidifies, and a second force, acting along an opposite direction to the first one, which depends both on the friction force at the interface between barrel and respective seat, which in turn depends on the friction coefficient typical of the materials from which the barrel and respective seat are made and on the dimensional tolerances of the coupling between barrel and respective seat, and on the force by which the arm of the focusing device holds the barrel in position in the respective seat during the hardening or solidification of the adhesive substance (such a force being adjustable by the worker).

The Applicant has found that, since the friction coefficient at the interface between barrel and respective seat is known once the materials from which the barrel and the respective seat are to be made have been selected, since the dimensional tolerances of the coupling between barrel and respective seat are known, and since the force by which the arm of the focusing device holds the barrel in position in the respective seat can be adjusted by the worker, the aforementioned second force can be quantatively determined. Consequently, in order to obtain the desired balance of the forces, once the position and the size of the through openings have been suitably selected, it is sufficient to select an adhesive substance whose coefficient of expansion in the solidification step exactly counterbalances such a second force. Alternatively, once an adhesive substance has been selected that ensures a suitable hold after gluing, and once the materials from which the barrel and the respective seat are to be made have been selected, being known the dimensional tolerances of the coupling between barrel and respective seat, it is possible to determine the pressure by which the arm of the focusing equipment must hold the barrel in position in the respective seat until the desired balance is obtained.

Preferably, an adhesive substance is used having a tensile strength equal to at least 3000 psi and a viscosity at 25° C. comprised between 6000 and 8000 cps, (measured through a rotor or spindle #3, at 10 RPM, with a Brookfield viscometer RVT). The Applicant has found that in this way it is possible to ensure the maximum hold against detachment and the best distribution of the adhesive substance inside the through openings.

Preferably, the reading device of the present invention comprises an electronic board associated with the one-piece block at said first light source and further light source.

In the preferred embodiments of the present invention, the reading device further comprises:
  a first deflecting mirror in optical alignment with said first optical group;
  a further deflecting mirror in optical alignment with said further optical group;
  a first adjusting member for adjusting the angular position of said first deflecting mirror with respect to said first optical group;
  a further adjusting member for adjusting the angular position of said further deflecting mirror with respect to said further optical group.

In the present invention, "optical alignment" of the deflecting mirror means a particular positioning such that the point of incidence of the optical axis of the light beam striking the mirror does not vary as the positioning angle of the mirror on a horizontal and/or vertical plane varies; this occurs when the aforementioned point of incidence is on the rotation axis of the mirror.

Preferably, said first adjustment member and further adjustment member are identical. In this way, an advantageous production saving is achieved.

Preferably, said first adjustment member and further adjustment member are adjustably positioned without acting on adjustment screws.

Preferably, each of said first adjustment member and further adjustment member comprises a first left/right adjustment bracket and a second up/down adjustment bracket.

Preferably, each left/right adjustment bracket is pivoted in said reading device at a first pivoting axis that, preferably, intersects a respective optical axis of said first optical axis and further optical axis. In this way it is possible to ensure that as the positioning angle of the left/right adjustment bracket (and therefore of the mirror associated with said bracket) varies, the point of incidence of the respective optical axis on said mirror always stays the same. The desired optical alignment is thus maintained.

Preferably, each left/right adjustment bracket comprises a supporting post for supporting the respective deflecting mirror and a base flange, said base flange comprising a first coupling portion for coupling with said reading device and, preferably, on the opposite side to said first coupling portion with respect to said supporting post, a second coupling portion for coupling with a tool for adjusting the angular position of said left/right adjustment bracket, said first pivoting axis being preferably defined in said first coupling portion.

Preferably, each left/right adjustment bracket is fixed in position inside said reading device through an adhesive substance, more preferably a UV glue of the same type used to fix the barrels in position in the respective seats formed in the one-piece block.

Preferably, said first deflecting mirror and further deflecting mirror are fixedly associated with the respective up/down adjustment bracket and each up/down adjustment bracket is rotatably mounted on the respective left/right adjustment bracket at a rotation axis that intersects a respective optical axis of said first optical axis and further optical axis. In this way it is possible to ensure that as the positioning angle of the up/down adjustment bracket (and therefore of the mirror associated with said bracket) varies, the point of incidence of the respective optical axis on said mirror always stays the same. The desired optical alignment is thus maintained.

Preferably, each up/down adjustment bracket comprises a central coupling portion for coupling with a respective left/right adjustment bracket, a first end portion for coupling with the respective deflecting mirror and, preferably, on the opposite side to said first end portion with respect to said central coupling portion, a second end portion, wherein said deflecting mirror is fixedly associated with said up/down adjustment bracket at said first end portion, said second end portion preferably comprising engagement means for engaging a tool for adjusting the angular position of said up/down adjustment bracket.

In the preferred embodiments of the present invention, each left/right adjustment bracket comprises at least two seats, for coupling with the respective up/down adjustment bracket, said two seats being arranged at different heights. The left/right adjustment bracket can thus support deflecting mirrors at different heights. This allows the same type of left/right adjustment bracket to be used for all of the optical groups provided in the reading device.

Preferably, each up/down adjustment bracket is fixed to a respective left/right adjustment bracket through an adhesive substance, more preferably a UV glue of the same type used to fix the barrels in position in the respective seats formed in the one-piece block.

Preferably, the central portion of the up/down adjustment bracket comprises a substantially flat top portion. Such a top portion defines an ideal surface for depositing the adhesive substance, thus promoting a greater uniformity of distribution of the adhesive substance.

Preferably, the one-piece block and said first adjustment member and further adjustment member are mounted on a single supporting board.

In a second aspect thereof, the invention relates to a method for focusing a reading device for reading coded information, said reading device comprising at least one optical group including a light source and focusing means in optical alignment with said light source along an optical axis and housed in a respective seat, wherein between said focusing means and said seat a predetermined friction force acts and wherein said seat has a through opening for the introduction of an adhesive substance adapted to fix said focusing means in said seat in a focus position, said method comprising the steps of:

selecting an adhesive substance having a predetermined coefficient of expansion during solidification;

during the solidification of said adhesive substance, holding said focusing means in said focus position by applying a holding force that, together with said friction force, counter-balances the force to which said focusing means are subjected because of the solidification of said adhesive substance.

The Applicant has found that, by carrying out the aforementioned method, it is possible to achieve an optimal focusing of the reading device. Indeed, on the one hand very small displacement resolutions are ensured and, on the other hand, undesired movements of the focus are prevented, as discussed above in greater detail.

Preferably, the reading device used in the aforementioned method comprises, individually or in combination, all of the features described above with reference to the reading device of the present invention.

For example, preferably, said adhesive substance is a glue having a tensile strength equal to at least 3000 psi and a viscosity at 25° C. comprised between 6000 and 8000 cps.

Preferably, said focusing means are housed in a barrel sized so as to be slidably coupled in said seat.

Preferably, said barrel is made of brass.

Preferably, said seat is formed in a one-piece block obtained through a single mechanical processing, more preferably through a machine tool processing.

Preferably, said one-piece block is made metallic material, preferably aluminium.

Preferably, said one-piece block comprises, at least at said seat, a surface coating having a low friction coefficient.

Further characteristics and advantages of the device of the present invention will become clearer from the following detailed description of a preferred embodiment thereof, made purely as a non-limiting example with reference to the attached drawings. In such drawings.

Figure 1:
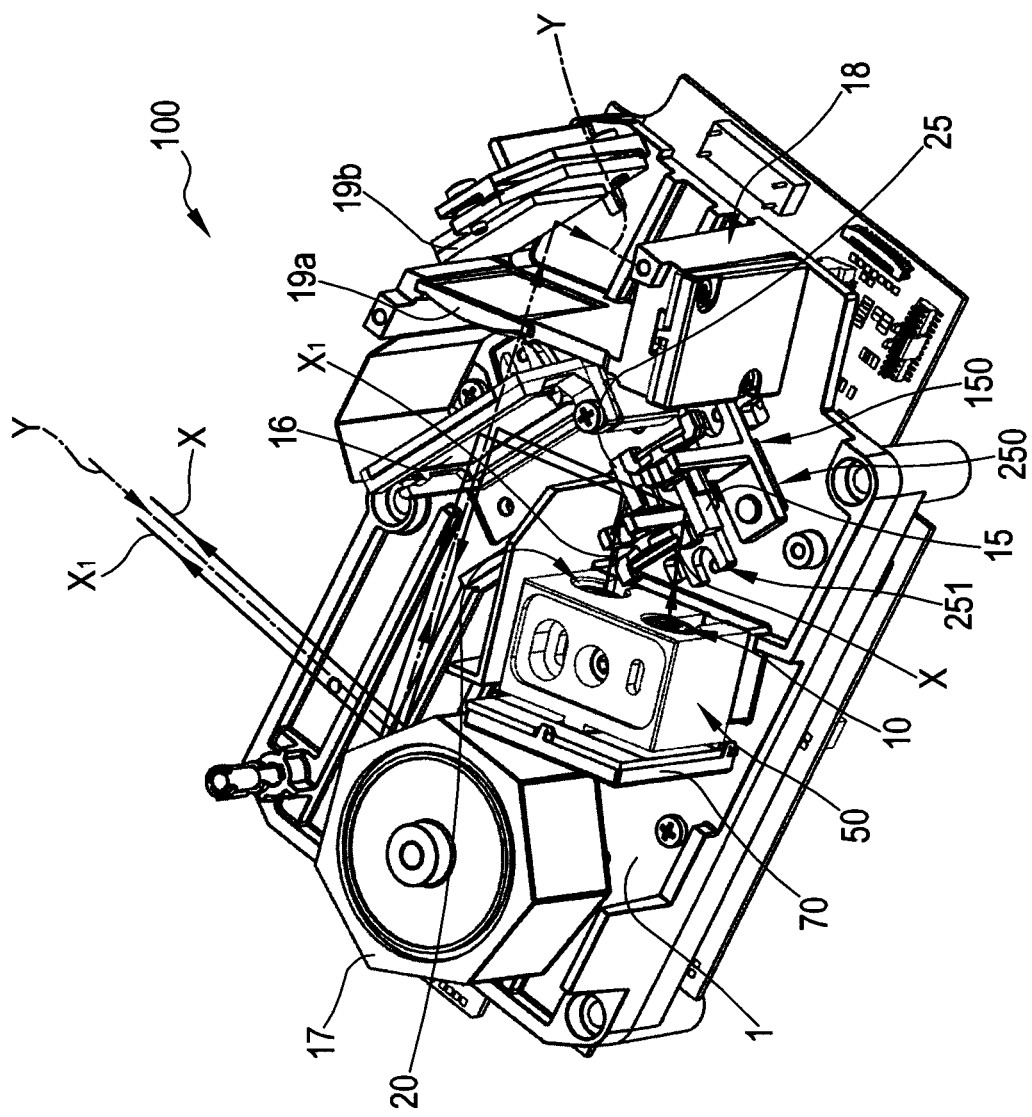
FIG. 1 is a schematic perspective view of a functional inner module of a reading device in accordance with the present invention.

In FIG. 1, reference numeral 100 indicates a reading device for reading coded information in accordance with the present invention. In particular, just the functional inner module of the reading device 100 is shown. The casing inside which the aforementioned module is housed is thus not shown.

The reading device 100 is, in particular, a laser scanner used for example in systems for transporting and sorting objects of various kinds (for example parcels, suitcases, bags, etc.) for the acquisition of data identifying the objects and for the consequent intelligent sorting of the objects themselves.

In these systems, the objects are placed on a conveyor belt that is in movement with respect to the laser scanner (which is typically mounted in a fixed position) and are sorted based on the reading of an optical code printed on a label associated with each object. Such reading is carried out through the aforementioned laser scanner.

The functional module shown in FIG. 1 comprises supporting board 1 for supporting the various opto-electronic and mechanical components of the reading device 100.

Figure 6:
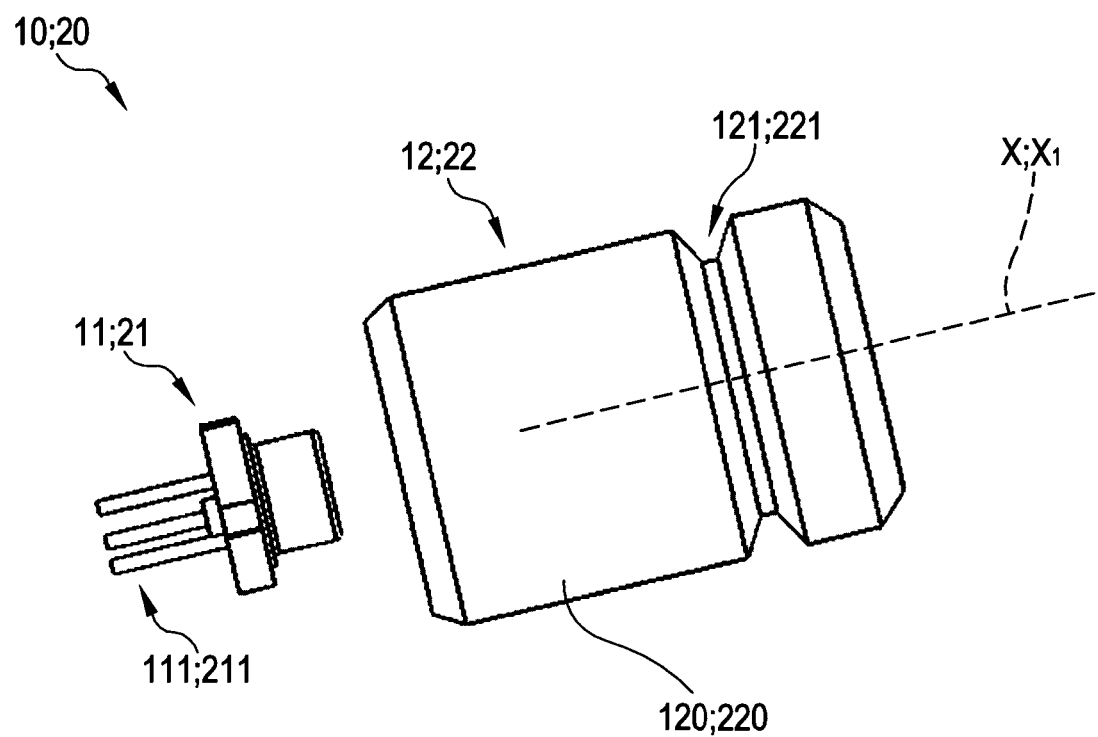
FIG. 6 is a schematic perspective view of an optical emission group housed in the one-piece block of FIG. 5.

In particular, on the board 1 two identical optical groups 10, 20 are mounted, shown in greater detail in FIG. 6.

Each of the optical groups 10, 20 comprises a respective light source 11, 21 (preferably a conventional semi-conductor laser diode) and respective focusing means 12, 22 of the light beam emitted by the respective light source 11, 21.

Each light source 11, 21 emits a respective laser light beam having a respective optical axis, indicated in the figures respectively with X and X1.

Figure 2:
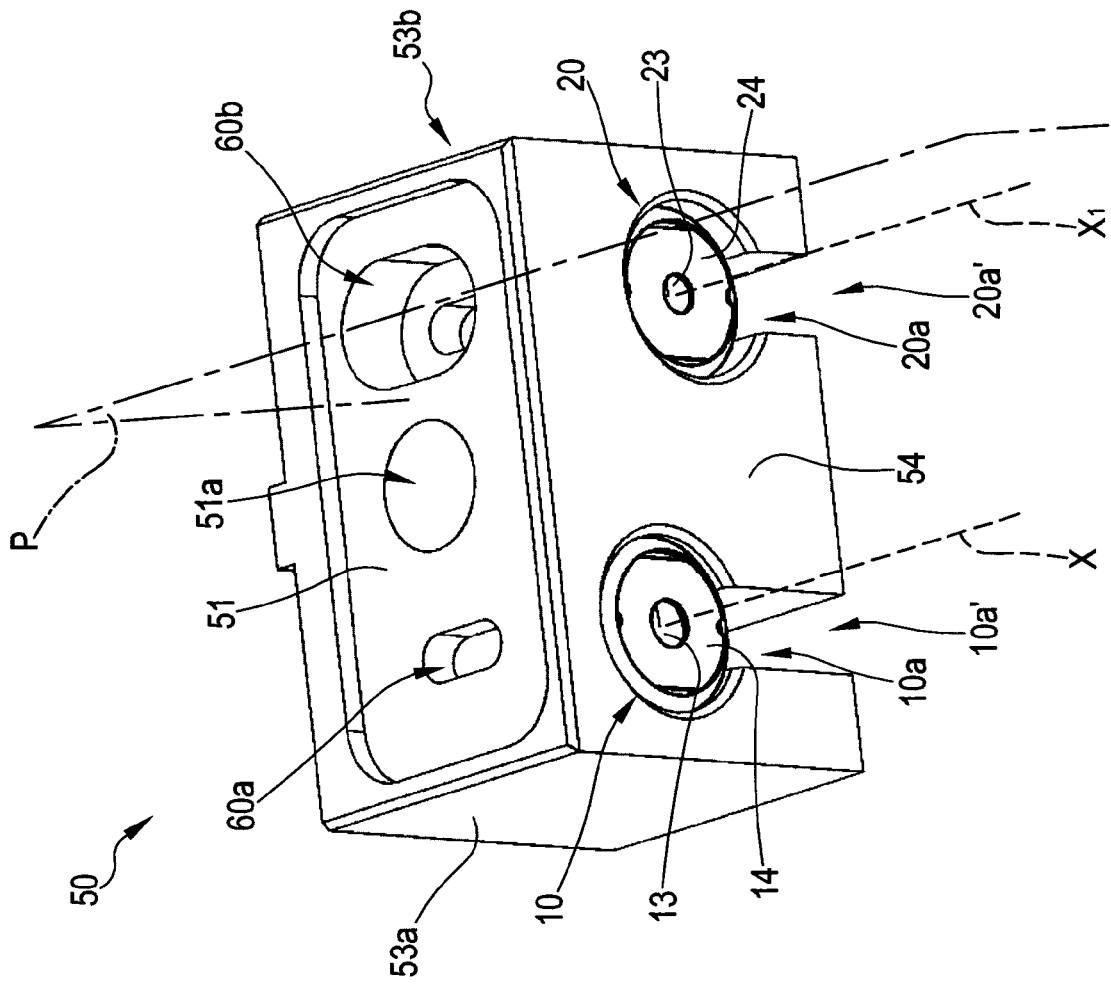
FIG. 2 is an enlarged schematic perspective view of a component of the module of FIG. 1.
Figure 4:
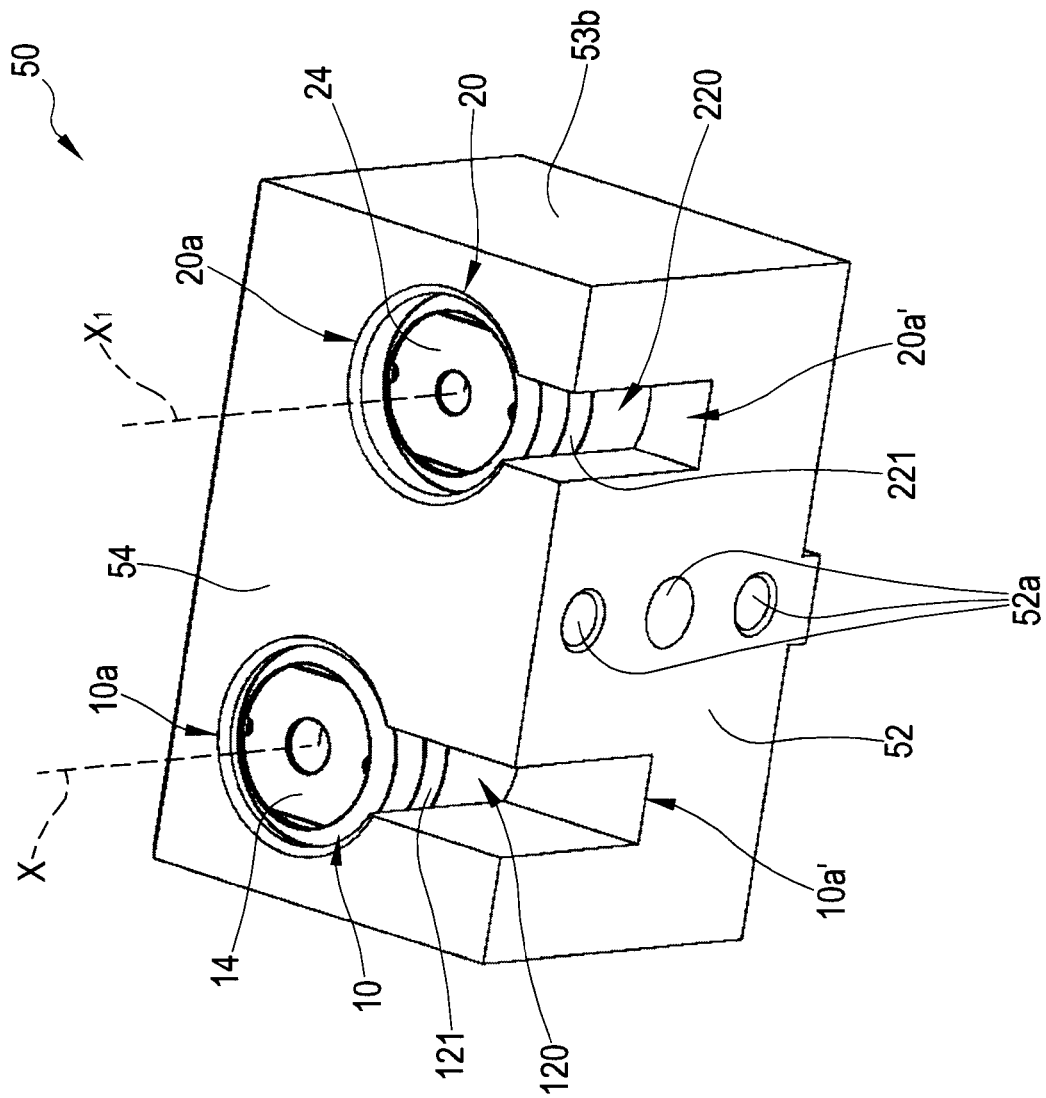
FIG. 4 is a schematic perspective view of the component of FIG. 2 from a yet different observation point.

As shown in FIGS. 1, 2 and 4, the optical axes X and X1 are substantially horizontal and substantially parallel. They maintain such a condition of substantially parallel optical arrangement along the respective optical emission paths defined between the respective light source 11, 21 and the illuminated object.

The focusing means 12, 22 are arranged in optical alignment with the respective light source 11, 21.

Figure 10:
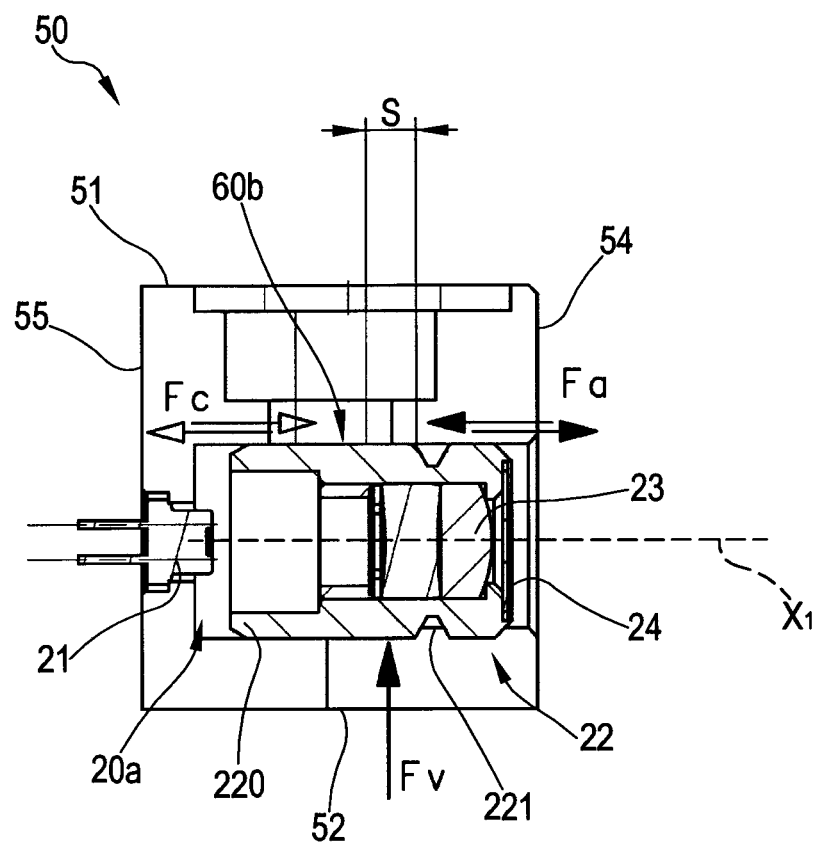
FIG. 10 shows, in a cross section of the component of FIG. 2 taken at a plane P, the forces acting on such a component during the focusing operations.

Each of the focusing means 12, 22 comprises in particular a barrel 120, 220 (FIGS. 4, 6 and 10) inside which at least one convergent lens 13, 23 (preferably a barrel comprising two or more lenses) and a diaphragm 14, 24, shown in FIGS. 2 and 10, are fixedly mounted.

As shown in FIGS. 4, 6 and 10, each barrel 120, 220 comprises an annular groove 121, 221 close to the emission face of the laser light beam that passes through it. Such an annular groove 121, 221 preferably has a substantially trapezoidal-shaped or conical orthogonal cross section.

With reference to FIG. 1, a respective deflecting group 150, 250 (shown in greater detail in FIGS. 7-9) is also mounted on the optical board 1 downstream of each of the optical groups 10, 20 with reference to the optical path of the light beams emitted by the light sources 11, 21. Each deflecting group 150, 250 comprises a respective mirror 15, adapted to deflect the light beam emitted by a respective light source 11, 21.

A single deflecting mirror 16 is also mounted on the optical board 1 downstream of the deflecting groups 150, 250, and a conventional scanning device 17 is arranged downstream of said mirror 16.

In the particular embodiment described herein, the light beams emitted by the light sources 11, 21 reach the objects on which the optical codes to be read are placed through respective optical paths (identified by the respective optical axes X, X1) each defined by a broken line comprising four sections inclined to one another. A first section is defined between each light source 11, 21 and the respective deflecting mirror 15, 25. A second section is defined between each deflecting mirror 15, 25 and the deflecting mirror 16. A third section is defined between the deflecting mirror 16 and the scanning device 17 and a fourth and last section is defined between the scanning device 17 and the illuminated object.

The functional module shown in FIG. 1 also comprises a photoreceiver device 18 adapted to collect the light diffused by the illuminated optical code and to generate an electrical signal proportional to the intensity of the collected light. Such an electrical signal, once it has been suitably processed, provides the sequence of the decoded characters of the optical code read.

A receiving lens 19a is arranged upstream of the photoreceiver device 18, with reference to the optical receiving path of the light diffused by each illuminated optical code, and a deflecting mirror 19b is arranged between the receiving lens 19a and the photoreceiver device 18.

In the particular embodiment described herein, the light beam diffused by the illuminated object reaches the photoreceiver device 18 through an optical path (identified in FIG. 1 by the optical axis Y indicated by a dotted line) defined by a broken line comprising three sections inclined to one another. A first section is defined between the illuminated object and the scanning device 17. A second section is defined between the scanning device 17 and the deflecting mirror 19b and a third and last section is defined between the deflecting mirror 19b and the photoreceiver device 18.

Figure 5:
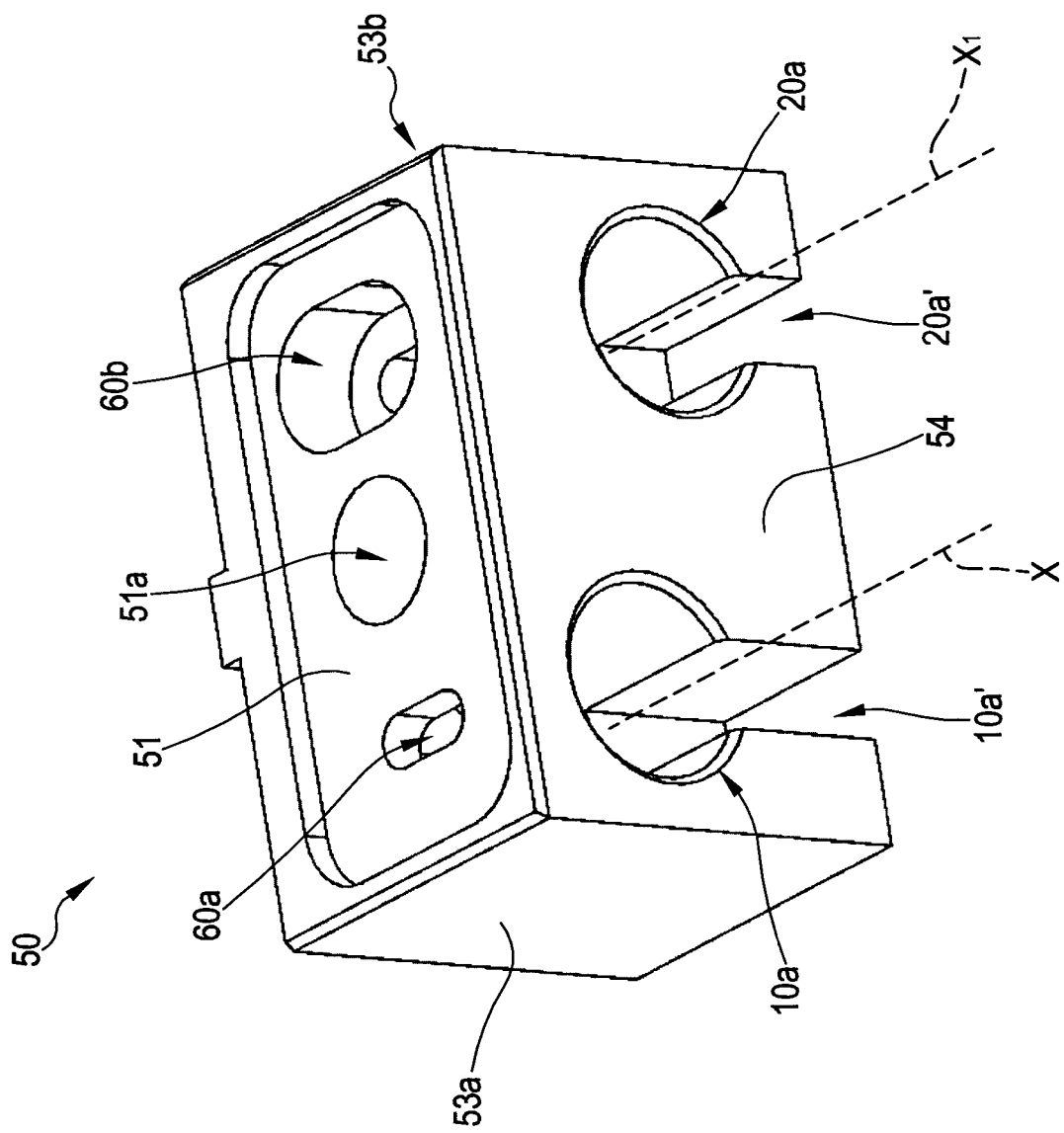
FIG. 5 is a schematic perspective view of a one-piece block of the component of FIGS. 2-4.

As shown in FIG. 2, the optical groups 10, 20 are housed inside suitable seats 10a, 20a having a substantially cylindrical shape and formed in a one-piece block 50, also shown in FIGS. 3-5 and described below.

In the specific embodiment shown, the one-piece block 50 is made of metallic material, preferably aluminium, and is obtained through processing with a conventional multi-axis numerical control machine tool. It has a massive structure, i.e. without openings or cavities specifically provided for weight reduction purposes. Such a massive structure advantageously ensures a high structural rigidity and a high mass for dissipating the heat generated by the light sources 11, 21.

In a specific embodiment, two laser light sources 11, 12 are used, each of which has a maximum power equal to 50 mW, and a maximum operating temperature of the reading device 100 of 50° C. is foreseen. In this case, the one-piece block of aluminium has an overall volume equal to at least 20 cm$^3$, with a tolerance of ±10%, so as to offer the light sources with a large mass for dissipating the heat generated thereby.

The seats 10a, 20a are formed through chip removal processing on the same machine tool on which the one-piece block 50 is manufactured.

The processing of the metallic block 50 thus includes just the positioning of the piece to be worked on the machine tool and the controlled movement of the chip removal tool around the aforementioned piece to define the final shape of the one-piece block 50. Since there are no manual displacement and/or repositioning operations of the piece, the precision with which the one-piece block 50 is manufactured is solely correlated to the precision of the machine tool used to manufacture it.

With reference to FIGS. 2-5, the one-piece block 50 comprises a top surface 51 on which a hole 51a is formed. Such a hole 51a is intended to allow the one-piece block 50 to be fixed on the supporting board 1.

The one-piece block 50 also comprises a base surface 52 (FIG. 4) comprising a plurality of holes. In the embodiment shown herein there are three holes, all indicated with 52a. The central hole is intended to allow the one-piece block 50 to be fixed on the supporting board 1, whereas the other two holes are intended to allow the one-piece block 50 to be centred on a focusing equipment described below, by coupling with corresponding centring pins suitable provided on the latter.

Figure 3:
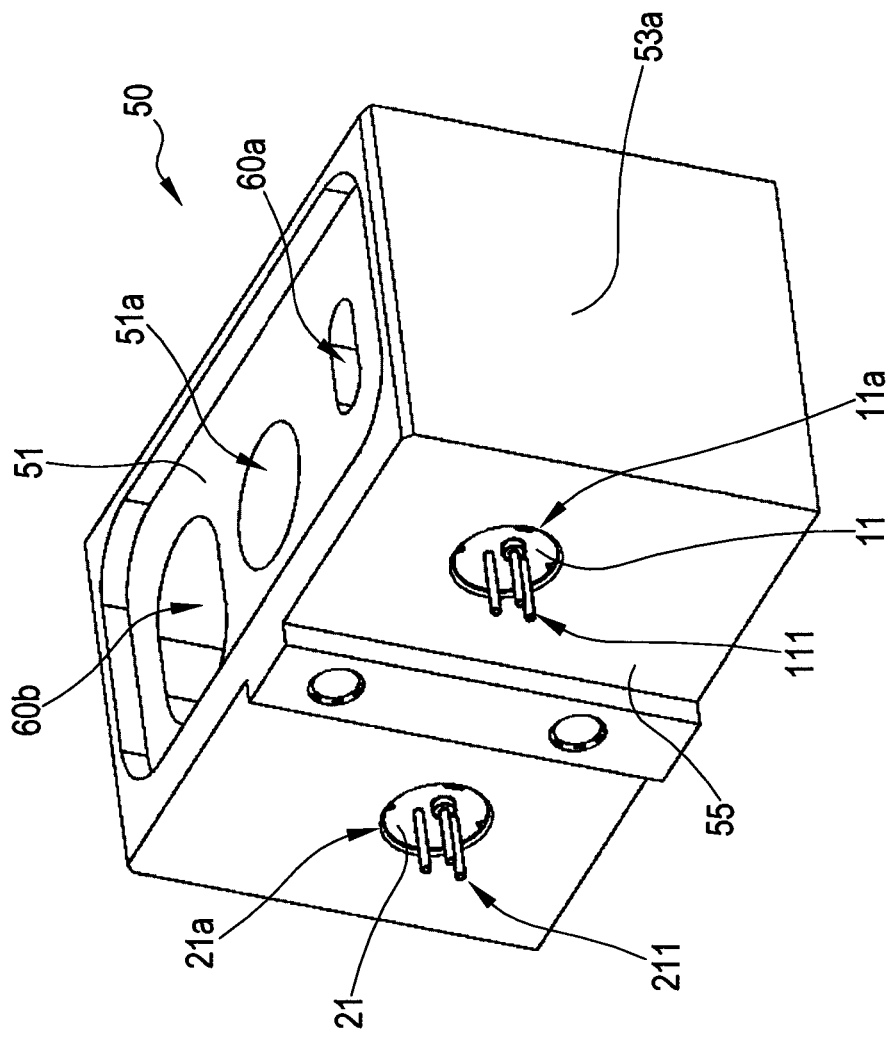
FIG. 3 is a schematic perspective view of the component of FIG. 2 from a different observation point.

The one-piece block 50 comprises opposite side surfaces 53a, 53b, a front surface 54 (FIGS. 2, 4 and 5) and a rear surface 55 (FIG. 3).

The one-piece block 50 also comprises, at each seat 10a, 20a, a through groove 10a', 20a' extending from the base surface 52 of the one-piece block 50 up to the seat 10a, 20a.

The through grooves 10a' and 20a' are parallel to one another and extend astride of respective planes of symmetry on which the respective optical axis X, X1 lies.

As shown in FIG. 3, the light sources 11, 21 are coupled, preferably by interference, with special holes 11a, 21a formed on the rear surface 55 of the one-piece block 50 coaxially to the seats 10a, 20a. The longitudinal axis of each hole 11a, 21a in this way substantially coincides with the longitudinal axis of the respective seat 10a, 20a and with the optical axis X, X1 of the light beam emitted by the respective light source 11, 21.

Again with reference to FIGS. 2-5, the longitudinal axes of the seats 10a, 20a housing the optical groups 10, 20 are substantially parallel to one another.

The seats 10a, 20a are formed in the one-piece block 50 at different heights with respect to the base surface 52. Consequently, the optical axes X and X1 of the light sources 11, 21 are in a desired condition of parallel optical arrangement and of vertical offsetting. The precision of the parallel optical arrangement thus achieved is high, deriving solely from the precision of the machine tool processing, which as known is high.

The barrels 120, 220 have a diameter that is slightly smaller than the diameter of the seats 10a, 20a, so as to slidably couple with the seats 10a, 20a. Such a possibility of sliding is exploited in the calibration step of the reading device 100 to focus the laser light beams emitted by the light sources 11, 21 to the desired distance.

Once focusing has been achieved, the barrels 120, 220 are fixed in position in the respective seats 10a, 20a through an adhesive substance. Such an adhesive substance is introduced into the seats 10a, 20a through respective through holes 60a, 60b formed on the top surface 51 of the one-piece block 50.

Each through opening 60a, 60b has a substantially elliptical shape, so as to define a slot.

As shown in FIG. 10, the position and the longitudinal size of each through opening 60a, 60b is preferably such that the through opening 60a, 60b does not go above the annular groove 121, 221 of the respective barrel 120, 220. In other words, a length S of non-juxtaposition between through opening 60a, 60b and annular groove 121, 221 of the respective barrel 120, 220 is provided in the position of most recessed position of the barrel 120, 200.

Preferably, the width of each through groove 60a, 60b does not exceed 50% of the diameter of the respective barrel 120, 220.

In general, indicating the diameter and the length of the barrels 120, 220 with D and L, respectively, the dimensions of each through opening 60a, 60b can be expressed by the following relationships: length equal to (0.43-0.45)L and width equal to (0.27-0.28)D.

In a preferred embodiment, the barrels 120, 220 have a diameter D equal to 11 mm and a length L equal to 16 mm; therefore, each through opening 60a, 60b has a width equal to about 3 mm and a length equal to about 7 mm.

Preferably, each through opening 60a, 60b has a depth of about 2.5-3 mm.

These dimensions ensure a condition of ideal compromise between having a sufficient surface to ensure the stability/hold of the glue and avoiding the through opening 60a, 60b at least partially juxtaposing the annular groove 121, 221.

The adhesive substance used is preferably a UV glue that, at room temperature, has a sufficiently dense liquid state and that, after having been illuminated by a suitable lamp (not shown), solidifies, thus permanently fixing the barrels 120, 220 in position in the respective seats 10a, 20a.

In particular a lamp is used at each through opening 60a, 60b, in order to obtain a substantially simultaneous solidification in both seats 10a, 20a.

The UV glue preferably has a sufficient density to allow the formation of droplets during deposition and to ensure that it remains in the position in which it was deposited to then be able to solidify in such a position. The UV glue is preferably dosed automatically through the through openings 60a, 60b by a suitable dispensing device that is not shown.

Preferably, a glue is used having a tensile strength equal to at least 3000 psi and a viscosity at 25° C. comprised between 6000 and 8000 cps, (measured through a rotor or spindle #3, at 10 RPM, with a Brookfield viscometer RVT), like for example OPTOCAST AC-3724L of Electronic Materials Incorporated of Breckenridge, Colo., USA.

The sliding of the barrels 120, 220 in the respective seats 10a, 20a is carried out by acting on the respective annular grooves 121, 221 through a suitable micrometric automatic focusing equipment, not shown.

In particular, in the calibration operation of the reading device 100, the aforementioned focusing equipment is arranged below the one-piece block 50 and comprises two arms, each of which crosses a respective through groove 10a', 20a' until it engages a respective annular groove 121, 221.

The focusing equipment comprises an actuator for controlling the movement of the aforementioned arms inside the through grooves 10a' 20a' (and therefore the movement of the barrels 120, 220 inside the seats 10a, 20a). The focusing equipment is also combined with a camera that films the footprint of the light beam emitted by each light source 11, 21 at the focusing distance and commands the actuator in order to move the arms (and therefore the barrels 120, 220) until focus is achieved.

The aforementioned arms have engagement ends which engage with the annular grooves 121, 221. The engagement ends have a shape matching the shape of the cross section of the annular grooves 121, 221. The sizing of the aforementioned arms is also such as to prevent them from coming into contact with the opposite surfaces of the through grooves 10a', 20a' during their movement.

With reference to FIG. 10, the focusing of the reading device 100 comprises, once the barrels 120, 220 have reached the focus position, the introduction in the one-piece block 50, through the through openings 60a, 60b, of the adhesive substance, so as to fix the barrels 120, 220 in position in the respective seats 10a, 20a. The fixing in position of the barrels 120, 220 takes place because of the solidification of the adhesive substance. During such solidification the barrels are held in position by the aforementioned arms with a force Fv that, added to the friction force Fa at the interface between barrels 120, 220 and respective seats 10a, 20a, generates an overall force equal and opposite to the force Fc exerted by the adhesive substance in the solidification step, thus obtaining an advantageous balancing of the various forces.

The barrels 120, 220 are preferably made of brass.

The inner surface of the seats 10a, 20a can be coated or treated so as to provide a low friction coefficient. In this case, a double surface treatment is foreseen, consisting of a hard oxidation and an impregnation by Teflon® (trade name of polytetrafluoroethylene, PTFE), as it is commonly and universally defined in the field.

With reference to FIG. 1, an electronic board 70 is associated with the rear surface 55 of the one-piece block 50 and with the rheophores 111, 211 of the light sources 11, 21 to command and control the operation of the latter.

As stated earlier and as shown in FIG. 1, the two deflecting groups 150, 250 are mounted downstream of the one-piece block 50, with reference to the optical paths defined by the optical axes X, X1 coming out from the one-piece block 50. Each deflecting group 150, 250 supports a respective deflecting mirror 15, 25 so that it is in optical alignment with a respective optical axis X, X1.

The two deflecting groups 150, 250 are identical. One of them is shown in detail in FIGS. 7-9.

Figure 7:
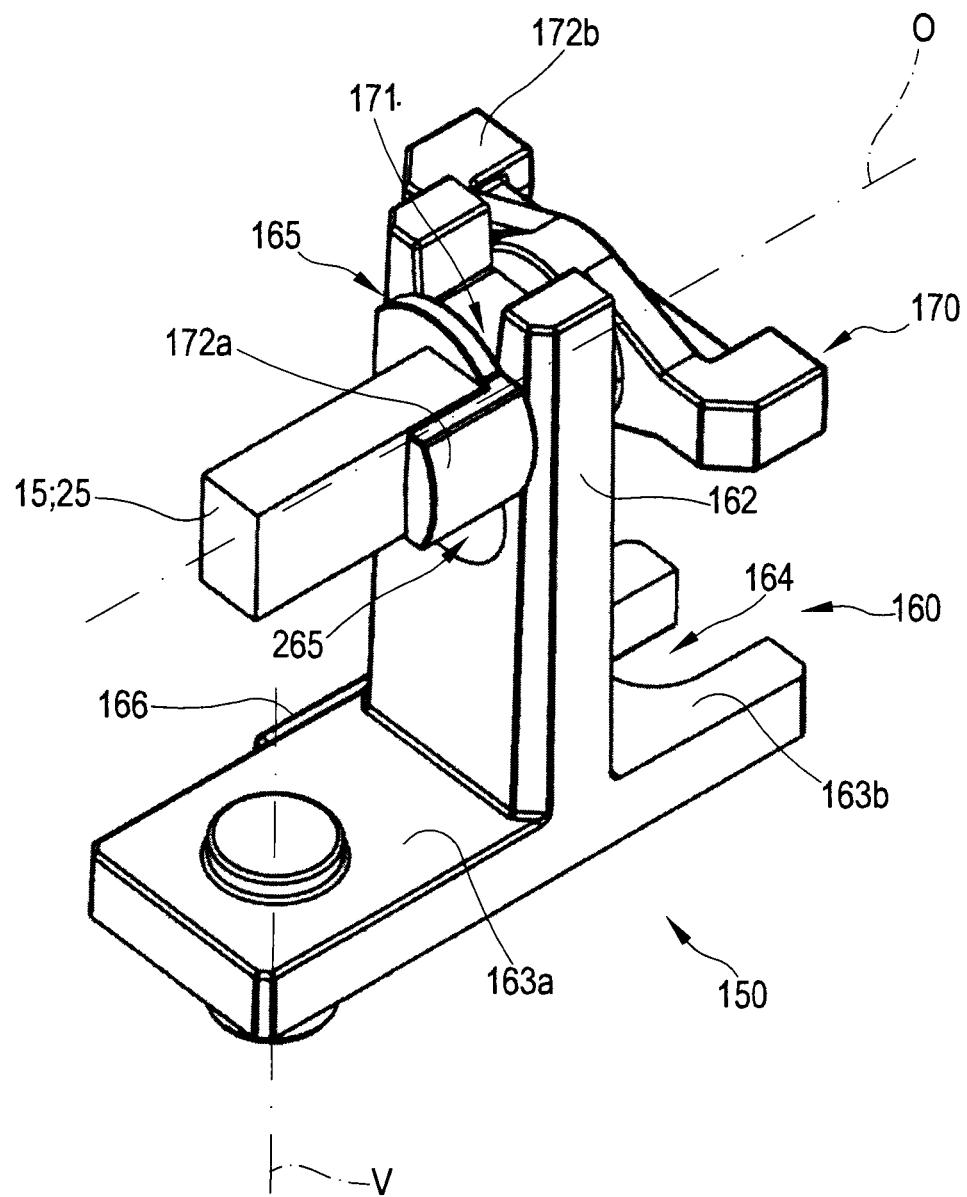
FIG. 7 is a schematic perspective view of an optical deflecting group arranged in the module of FIG. 1.
Figure 8:
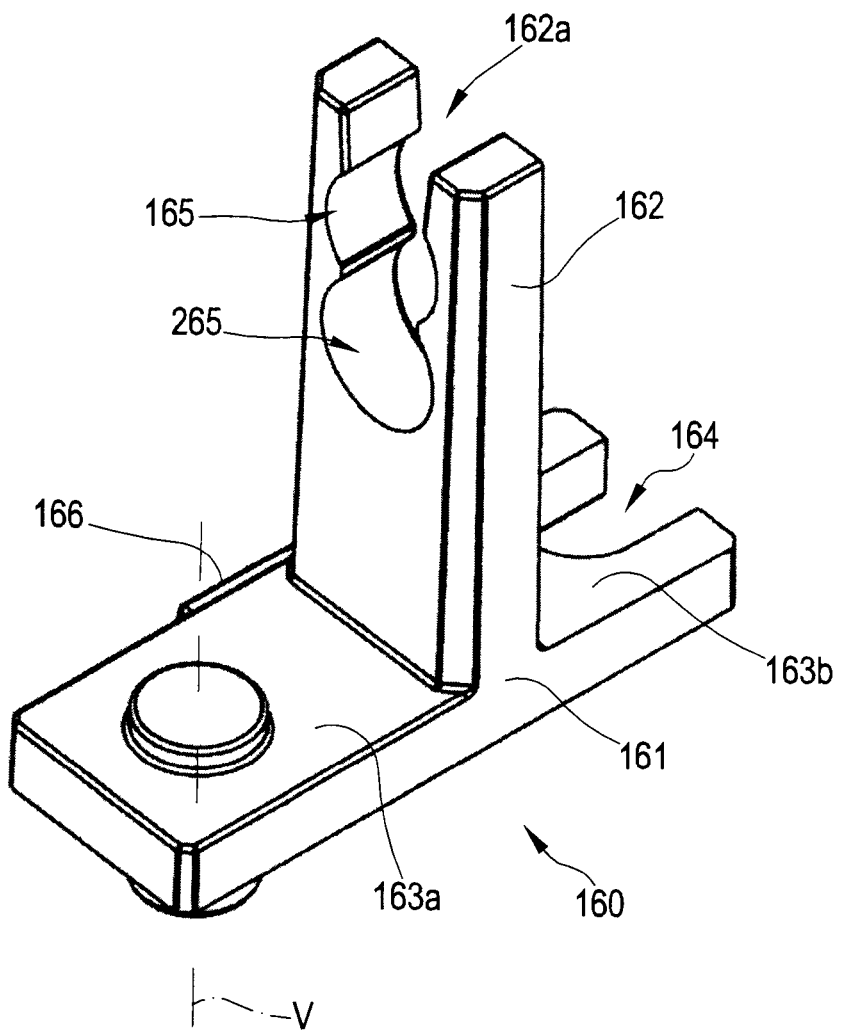
FIG. 8 is a schematic perspective view of a first adjustment bracket of the optical deflecting group of FIG. 7.

Each deflecting group 150, 250 comprises a first bracket 160 for adjusting the angular position of the mirror 15, 25 on a horizontal plane (hereafter "left/right adjustment bracket" or "vertical bracket"). Such a bracket 160 is mounted on the supporting board 1 and is shown in FIGS. 7 and 8.

Figure 9:
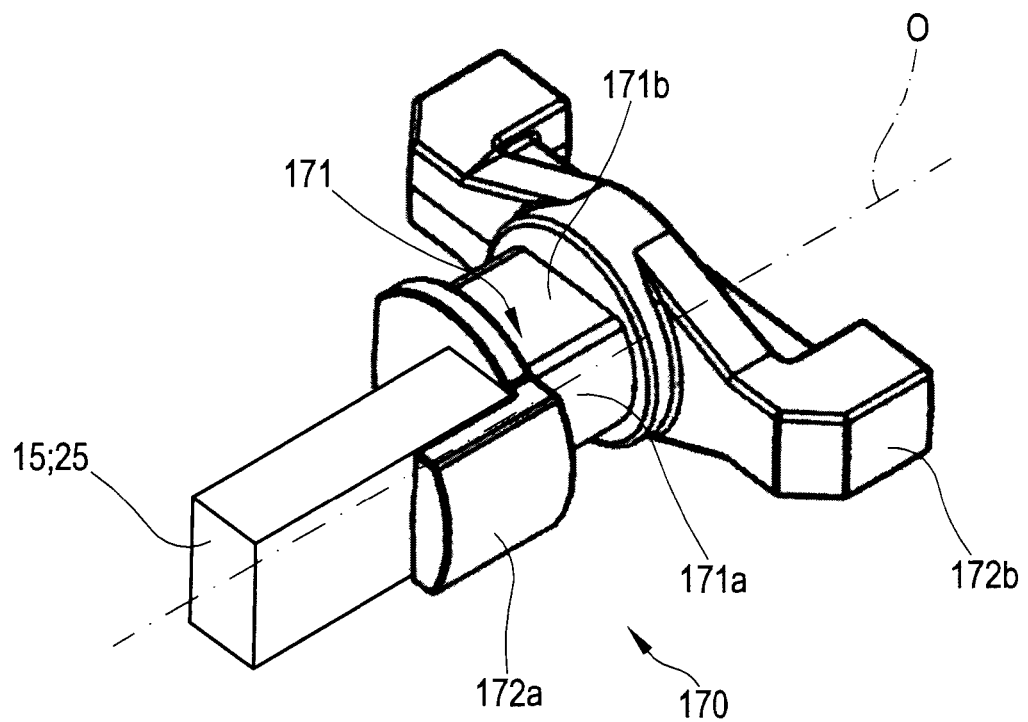
FIG. 9 is a schematic perspective view of a second adjustment bracket of the optical deflecting group of FIG. 7.

Each deflecting group 150, 250 also comprises a second bracket 170 for adjusting the angular position of the mirror 15, 25 on a vertical plane (hereafter "up/down adjustment bracket" or "horizontal bracket"). Such a bracket 170 is rotatably coupled with the vertical bracket 160 and is shown in FIGS. 7 and 9.

The deflecting mirror 15, 25 is fixedly mounted (preferably through a suitable adhesive substance) on the horizontal bracket 170.

The vertical bracket 160 has a base flange 161 pivoted to the supporting board 1 at a substantially vertical pivoting axis V. The pivoting axis V intersects a respective optical axis X, X1 on the respective mirror 15, 25.

An post 162 extends substantially perpendicular to the base flange 161 at an intermediate portion thereof.

The post 162 defines two opposite coupling portions in the base flange 161. On a first coupling portion 163a the pivoting axis V is defined, whereas on the opposite coupling portion 163b a seat 164 is defined for a tool (not shown) used to carry out the left/right adjustment.

In a preferred embodiment of the present invention, suitable for ensuring a resolution of the left/right adjustment of 0.02°, the length of the base flange 161 is equal to about 19 mm.

A tab 166 projects from a central portion of a side surface of the vertical bracket 160.

On the post 162 two seats 165, 265 are formed for coupling with the bracket 170. Such seats 165, 265 are formed at a different height and both have opposite cylindrical surface portions. When the bracket 160 is used to support the deflecting mirror 15 arranged at the optical axis X, the bracket 170 is coupled with the seat 165 (as shown in FIG. 7). Otherwise, when the bracket 160 is used to support the deflecting mirror 25 arranged at the optical axis X1, the bracket 170 is coupled with the seat 265 (as can be glimpsed in FIG. 1).

The horizontal bracket 170 comprises a central portion 171 for coupling with one of the aforementioned seats 165, 265.

The central portion 171 comprises opposite cylindrical surface portions adapted to allow the rotation of the horizontal bracket 170 with respect to the vertical bracket 160 in order to obtain the up/down adjustment. In FIG. 9 it is only possible to see one of said cylindrical surface portions, indicated with 171a.

The central portion 171 also comprises a substantially flat top portion 171b. Such a top portion 171b is adapted to face upwards when the horizontal bracket 170 is mounted in the reading device 100. The aforementioned top portion, in addition to promote better uniformity of distribution of the adhesive substance on the up/down adjustment bracket, allows the insertion of the horizontal bracket in the proper seat 165, 265 through an opening 162a formed on the top of the vertical bracket 160, such an opening being defined by opposite flat surfaces.

The rotation of the horizontal bracket 170 with respect to the vertical bracket 160 takes place around a substantially horizontal rotation axis O. The rotation axis O intersects a respective optical axis X, X1 on a respective mirror 15, 25.

The horizontal bracket 170 comprises two end portions arranged on opposite sides with respect to the central portion 171. On a first end portion 172a the mirror 15, 25 is mounted, whereas the opposite end portion 172b is shaped so as to define an engagement arm for engaging a tool used to carry out the up/down adjustment.

In a preferred embodiment of the present invention, suitable for ensuring a resolution of the up/down adjustment of 0.07°, the length of the horizontal bracket 170 is equal to about 8 mm.

Once the desired angular position of the vertical bracket 160 and of the horizontal bracket 170 (and therefore, overall, the angular position of the deflecting mirrors 15, 25 with respect to the horizontal and vertical planes) has been achieved, the aforementioned brackets are fixed in position (the vertical bracket 160 with respect to the supporting board 1 and the horizontal bracket 170 with respect to the vertical bracket 160) through an adhesive substance that, preferably, is a UV glue of the same type used to fix the barrels 120, 220 in position in the respective seats 10a, 20a formed in the one-piece block 50.

As shown in FIG. 1, the vertical bracket 160 of the deflecting group 150 (i.e. the vertical bracket 160 that supports the mirror 15) is mounted in opposite position with respect to the vertical bracket 160 of the deflecting group 250 (i.e. the vertical bracket 160 that supports the mirror 25). In this case, the tabs 166 of the two vertical brackets 160 are side-by-side, so that the dosing of the adhesive substance in the area engaged by both of the tabs 166 allows both of the vertical brackets 160 to be blocked in position. The seats 164 of the two vertical brackets 160, on the other hand, are oriented opposite to the respective posts 162. Similarly, the end portions 172b of the two horizontal brackets 170 are oriented opposite to the respective posts 162. In this way it is possible to mount the two mirrors 15, 25 at the minimum distance apart from one other (with clear advantages in terms of compactness of the reading device 100) without risking any mechanical interference in the left/right and up/down adjustment operations.

From the above description, it can be understood that the reading device 100 of the present invention makes it possible, through a relatively simple mechanical structure, to reduce to the minimum the number of components subject to adjustment and the manual calibration interventions, achieving the foreseen purposes identified above. It can also be understood that the focusing method described above allows an optimum focusing of the reading device.

Of course, a man skilled in the art can make further changes and modifications in order to meet specific and contingent application requirements, these changes and modifications in any case falling within the scope of protection defined by the following claims.

The invention claimed is:

1. A reading device for reading coded information, comprising:
   a first optical group including a first light source and first focusing means in optical alignment with said first light source along an optical axis (X);
   at least one further optical group including a further light source and further focusing means in optical alignment with said further light source along a further optical axis (X1) parallel to said first optical axis (X);
   wherein said first optical group and at least one further optical group are housed in respective seats formed in a single one-piece block obtained through a single mechanical processing;
   wherein said one-piece block comprises:
      a first seat for housing said first light source and said first focusing means, said first seat being formed coaxially to a first longitudinal axis;
      at least one further seat for housing said further light source and said further focusing means, said at least one further seat being formed coaxially to a further longitudinal axis parallel to said first longitudinal axis; and
      wherein said first longitudinal axis and further longitudinal axis coincide with said first optical axis (X) and further optical axis (X1), respectively.

2. The reading device according to claim 1, wherein said first optical group and further optical group are adjustably positioned without acting on adjustment screws.

3. The reading device according to claim 1, wherein said one-piece block comprises a base surface for mounting in said reading device, and wherein said first longitudinal axis and further longitudinal axis are at different distances from said base surface.

4. The reading device according to claim 3, wherein said one-piece block comprises a first through opening open in said first seat and a further through opening open in said further seat, and wherein each of said first through groove and further through groove is open at said base surface and each of said first through opening and further through opening is open at a top surface of said one-piece block.

5. The reading device according to claim 1, wherein said first light source and further light source are coupled by interference with said first seat and further seat, respectively.

6. The reading-device according to claim 1, wherein said first focusing means are housed in a first barrel and said further focusing means are housed in a further barrel, said first barrel and further barrel being sized so as to be slidably coupled in said first seat and further seat, respectively.

7. The reading device according to claim 6, wherein each of said first barrel and further barrel comprises a respective annular groove.

8. The reading device according to claim 1, wherein said one-piece block comprises a first through groove open in said first seat and a further through groove open in said further seat.

9. The reading device according to claim 8, wherein said first through groove and further through groove are parallel to one another and comprise respective planes of symmetry containing said first longitudinal axis and said further longitudinal axis, respectively.

10. The reading device according to claim 1, wherein said one-piece block comprises a first through opening open in said first seat and a further through opening open in said further seat.

11. The reading device according to claim 10, wherein each of said first barrel and further barrel comprises a respective annular groove, and wherein said first through opening and further through opening do not extend up to above the annular groove irrespective of the axial position of said first barrel and further barrel.

12. The reading device according to claim 1, wherein said one-piece block comprises, at least at said first seat and further seat, a surface coating having a low friction coefficient.

13. The reading device according to claim 1, further comprising:
a first deflecting mirror in optical alignment with said first optical group;
a further deflecting mirror in optical alignment with said further optical group;
a first adjustment member for adjusting the angular position of said first deflecting mirror with respect to said first optical group;
a further adjustment member for adjusting the angular position of said further deflecting mirror with respect to said further optical group.

14. The reading device according to claim 13, wherein said first adjustment member and further adjustment member are identical.

15. The reading device according to claim 13, wherein said first adjustment member and further adjustment member are adjustably positioned without acting on adjustment screws.

16. The reading device according to claim 13, wherein each of said first adjustment member and further adjustment member comprises a first left/right adjustment bracket and a second up/down adjustment bracket.

17. The reading device according to claim 16, wherein each left/right adjustment bracket is pivoted in said reading device at a first pivoting axis (V) that intersects a respective optical axis (X, X1) of said first optical axis (X) and further optical axis (X1).

18. The reading device according to claim 17, wherein each left/right adjustment bracket comprises a supporting post for supporting the respective deflecting mirror and a base flange, said base flange comprising a first coupling portion for coupling with said reading device and, on the opposite side to said first coupling portion with respect to said supporting post, a second coupling portion for coupling with a tool for adjusting the angular position of said left/right adjustment bracket, wherein said first pivoting axis (V) is defined in said first coupling portion.

19. The reading device according to claim 16, wherein said first deflecting mirror and further deflecting mirror are fixedly associated with the respective up/down adjustment bracket and wherein each up/down adjustment bracket is rotatably mounted on the respective left/right adjustment bracket at a rotation axis (O) that intersects a respective optical axis (X, X1) of said first optical axis (X) and further optical axis (X1).

20. The reading device according to claim 16, wherein each up/down adjustment bracket comprises a central coupling portion for coupling with a respective left/right adjustment bracket, a first end portion for coupling with the respective deflecting mirror and, on the opposite side to said first end portion with respect to said central coupling portion, a second end portion, wherein said deflecting mirror is fixedly associated with said up/down adjustment bracket at said first end portion and wherein said second end portion comprises engagement means for engaging a tool for adjusting the angular position of said up/down adjustment bracket.

21. The reading device according to claim 20, wherein said central portion comprises a substantially flat top portion.

22. The reading device according to claim 16, wherein each left/right adjustment bracket comprises at least two seats for coupling with the respective up/down adjustment bracket, said two seats being arranged at different heights.

23. The reading device according to claim 13, wherein said one-piece block and said first adjustment member and further adjustment member are mounted on a single supporting board.

24. A method for focusing a reading device for reading coded information, said reading device comprising at least one optical group including a light source and focusing means in optical alignment with said light source along an optical axis (X, X1) and housed in a respective seat, wherein between said focusing means and said seat a predetermined friction force (Fa) acts and wherein said seat has a through opening for the introduction of an adhesive substance adapted to fix said focusing means in said seat in a focus position, said method comprising the steps of:
selecting an adhesive substance having a predetermined coefficient of expansion during solidification;
during the solidification of said adhesive substance, holding said focusing means in said focus position by applying a holding force (Fv) that, together with said friction force (Fa), counter-balances the force to which said focusing means are subjected because of the solidification of said adhesive substance.

25. The method according to claim 24, wherein said focusing means are housed in a barrel sized so as to be slidingly coupled in said seat.

26. The method according to claim 24, wherein said one-piece block comprises, at least at said seat, a surface coating having a low friction coefficient.

27. A reading device for reading coded information, comprising:
a first optical group including a first light source and first focusing means in optical alignment with said first light source along an optical axis (X);
at least one further optical group including a further light source and further focusing means in optical alignment with said further light source along a further optical axis (X1) parallel to said first optical axis (X);
wherein said first optical group and at least one further optical group are housed in respective seats formed in a single one-piece block obtained through a single mechanical processing, and wherein said one-piece block comprises, at least at said first seat and further seat, a surface coating having a low friction coefficient.

28. The reading device according to claim 27, wherein said one-piece block further comprises:

a first seat for housing said first light source and said first focusing means, said first seat being formed coaxially to a first longitudinal axis;

at least one further seat for housing said further light source and said further focusing means, said at least one further seat being formed coaxially to a further longitudinal axis parallel to said first longitudinal axis; and wherein said first longitudinal axis and further longitudinal axis coincide with said first optical axis (X) and further optical axis (X1), respectively.

29. The reading device according to claim 27, further comprising:

a first deflecting mirror in optical alignment with said first optical group;

a further deflecting mirror in optical alignment with said further optical group;

a first adjustment member for adjusting the angular position of said first deflecting mirror with respect to said first optical group; and a further adjustment member for adjusting the angular position of said further deflecting mirror with respect to said further optical group.

30. A reading device for reading coded information, comprising:

a first optical group including a first light source and first focusing means in optical alignment with said first light source along an optical axis (X);

at least one further optical group including a further light source and further focusing means in optical alignment with said further light source along a further optical axis (X1) parallel to said first optical axis (X);

wherein said first optical group and at least one further optical group are housed in respective seats formed in a single one-piece block obtained through a single mechanical processing;

a first deflecting mirror in optical alignment with said first optical group;

a further deflecting mirror in optical alignment with said further optical group;

a first adjustment member for adjusting the angular position of said first deflecting mirror with respect to said first optical group; and a further adjustment member for adjusting the angular position of said further deflecting mirror with respect to said further optical group.

31. The reading device according to claim 30, wherein said one-piece block comprises:

a first seat for housing said first light source and said first focusing means, said first seat being formed coaxially to a first longitudinal axis;

at least one further seat for housing said further light source and said further focusing means, said at least one further seat being formed coaxially to a further longitudinal axis parallel to said first longitudinal axis; and wherein said first longitudinal axis and further longitudinal axis coincide with said first optical axis (X) and further optical axis (X1), respectively.

32. The reading device according to claim 30, wherein said one-piece block comprises, at least at said first seat and further seat, a surface coating having a low friction coefficient.

* * * * *